(12) United States Patent
Blakeman et al.

(10) Patent No.: US 9,999,876 B2
(45) Date of Patent: Jun. 19, 2018

(54) CATALYST BLENDS

(71) Applicant: Johnson Matthey Public Limited Company, London (GB)

(72) Inventors: Philip Gerald Blakeman, Shanghai (CN); Guy Richard Chandler, Royston (GB); Hai-Ying Chen, Wayne, PA (US); Debnath De, Malvern, PA (US); Joseph Michael Fedeyko, Wayne, PA (US); Alexander Nicholas Michael Green, Royston (GB); Wendy Manning, Wayne, PA (US); Shadab Mulla, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days. days.

(21) Appl. No.: 15/461,558

(22) Filed: Mar. 17, 2017

(65) Prior Publication Data

US 2017/0182482 A1 Jun. 29, 2017

Related U.S. Application Data

(63) Continuation of application No. 14/845,312, filed on Sep. 4, 2015, now Pat. No. 9,610,571, which is a (Continued)

(51) Int. Cl.
*B01D 53/94* (2006.01)
*B01J 23/42* (2006.01)
(Continued)

(52) U.S. Cl.
CPC ........ *B01J 29/005* (2013.01); *B01D 53/9418* (2013.01); *B01J 23/42* (2013.01);
(Continued)

(58) Field of Classification Search
CPC ........ B01D 53/9418; B01D 2255/1021; B01D 2255/20738; B01D 2255/20761;
(Continued)

(56) References Cited

U.S. PATENT DOCUMENTS 9,126,180 B2 * 9/2015 Fedeyko ............ B01D 53/9418
9,486,792 B2 * 11/2016 Mohanan ................ B01J 29/80
(Continued)

FOREIGN PATENT DOCUMENTS

WO   WO 2008132452 A2 *  11/2008   ......... B01D 53/9418
WO   WO 2010114873 A2 *  10/2010   ......... B01D 53/9472

OTHER PUBLICATIONS

Dustin W. Fickle et al. "The ammonia selective catalytic reduction activity of copper-exchanged small-pore zeolites" Applied Catalysis B: Environmental 102 (2011) pp. 441-448. (Year: 2011).*

*Primary Examiner* — Timothy C Vanoy (57) ABSTRACT

Provided is a catalyst for the selective reduction of NOx comprising a two molecular sieve materials having a CHA structure, wherein the first molecular sieve has a mean crystal size of about 0.01 to 1 μm and the second molecular sieve has a mean crystal size of about 1-5 μm, and wherein the first molecular sieve contains a first extra-framework metal, the second molecular sieve contains a second extra-framework metal, and wherein said first and second extra-framework metals are independently selected from the group consisting of cesium, copper, nickel, zinc, iron, tin, tungsten, molybdenum, cobalt, bismuth, titanium, zirconium, antimony, manganese, chromium, vanadium, niobium, and combinations thereof.

20 Claims, 3 Drawing Sheets

Related U.S. Application Data continuation of application No. 14/373,268, filed as application No. PCT/IB2013/000096 on Jan. 28, 2013, now Pat. No. 9,126,180.

(60) Provisional application No. 61/593,030, filed on Jan. 31, 2012.

(51) Int. Cl.

| | | |
|---|---|---|
| *B01J 23/44* | (2006.01) | |
| *B01J 29/00* | (2006.01) | |
| *B01J 35/04* | (2006.01) | |
| *F01N 3/20* | (2006.01) | |
| *B01J 29/76* | (2006.01) | |
| *B01J 29/85* | (2006.01) | |
| *B01J 35/00* | (2006.01) | |
| *F01N 3/08* | (2006.01) | |
| *F01N 3/28* | (2006.01) | |
| *F01N 3/035* | (2006.01) | |
| *B01J 29/70* | (2006.01) | |

(52) U.S. Cl.
CPC ............. *B01J 23/44* (2013.01); *B01J 29/763* (2013.01); *B01J 29/85* (2013.01); *B01J 35/0006* (2013.01); *B01J 35/04* (2013.01); *F01N 3/0814* (2013.01); *F01N 3/0842* (2013.01); *F01N 3/2066* (2013.01); *F01N 3/2842* (2013.01); *B01D 2251/2062* (2013.01); *B01D 2255/1021* (2013.01); *B01D 2255/1023* (2013.01); *B01D 2255/2092* (2013.01); *B01D 2255/20738* (2013.01); *B01D 2255/20761* (2013.01); *B01D 2255/30* (2013.01); *B01D 2255/50* (2013.01); *B01D 2255/91* (2013.01); *B01D 2255/9155* (2013.01); *B01D 2257/404* (2013.01); *B01J 29/7015* (2013.01); *F01N 3/035* (2013.01); *F01N 2610/02* (2013.01); *Y02T 10/24* (2013.01)

(58) Field of Classification Search
CPC ........ B01D 2255/50; B01D 2255/9155; B01D 2257/404; B01D 53/9436; B01D 2255/1023; B01J 29/763; B01J 23/44; B01J 23/42; B01J 35/04; B01J 35/0006; B01J 29/7015; B01J 29/005; B01J 2029/062; B01J 29/064; F01N 3/2066; F01N 3/035; F01N 2610/02; F01N 3/2842; F01N 3/0842; F01N 3/0814
See application file for complete search history.

(56) References Cited

U.S. PATENT DOCUMENTS

| | | | |
|---|---|---|---|
| 2015/0064088 A1* | 3/2015 | Green | B01J 37/0246 423/239.2 |
| 2015/0065336 A1* | 3/2015 | Sato | B01J 29/80 502/67 |

* cited by examiner

CATALYST BLENDS

CROSS-REFERENCE TO RELATED APPLICATIONS

This application is a continuation of U.S. patent application Ser. No. 14/845,312 (allowed), filed Sep. 4, 2015, which claims priority to U.S. Pat. No. 9,126,180, issued on Sep. 8, 2015, which claims priority of PCT Patent Application No. PCT/IB2013/000096, filed Jan. 28, 2013, which claims priority of U.S. Provisional Patent Application No. 61/593,030, filed Jan. 31, 2012, the disclosures of which are incorporated herein by reference in their entirety for all purposes.

BACKGROUND

1. Field of Invention

The present invention relates to catalysts, articles, and methods for treating combustion exhaust gas, specifically selective catalytic reduction (SCR) of $NO_x$ in lean-burn combustion exhaust gas.

2. Description of Related Art

The largest portions of most combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of these undesirable components, preferably by a process that, in turn, does not generate other noxious or toxic substances.

One of the most burdensome components to remove from a lean burn exhaust gas is $NO_x$, which includes nitric oxide (NO), nitrogen dioxide ($NO_2$), and nitrous oxide ($N_2O$). The reduction of $NO_x$ to $N_2$ in a lean burn exhaust gas, such as that created by diesel engines, is particularly problematic because the exhaust gas contains enough oxygen to favor oxidative reactions instead of reduction. However, $NO_x$ can be reduced in a diesel exhaust gas by a process commonly known as Selective Catalytic Reduction (SCR). An SCR process involves the conversion of $NO_x$, in the presence of a catalyst and with the aid of a reductant, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

$$2NO+4NH_3+2O_2 \rightarrow 3N_2+6H_2O$$

$$2NO_2+4NH_3+O_2 \rightarrow 3N_2+6H_2O$$

$$NO+NO_2+2NH_3 \rightarrow 2N_2+3H_2O$$

Known SCR catalysts include zeolites and other molecular sieves. Molecular sieves are microporous crystalline solids with well-defined structures and generally contain silicon, aluminum and oxygen in their framework and can also contain cations within their pores. A defining feature of a molecular sieve is its crystalline or pseudo-crystalline structure which is formed by molecular tetrahedral cells interconnected in a regular and/or repeating manner to form a framework. Examples of molecular sieves frameworks that are known SCR catalysts include Framework Type Codes CHA (chabazite), BEA (beta), and MOR (mordenite). Catalytic performance of these molecular sieves may be improved in certain environments by a cationic exchange process wherein a portion of ionic species existing on the surface or within the framework is replaced by transition metal cations, such $Cu^{2+}$. In general, a higher metal loading on such molecular sieves can result in decreased durability of the material, particularly when the material is exposed to high temperatures. Accordingly, there remains a need for more durable, high performance SCR catalysts.

SUMMARY OF THE INVENTION

Applicants have surprisingly discovered that certain blends of metal promoted CHA molecular sieves yield better performance, such as $NO_x$ conversion and hydrothermal stability, compared to the performance of each constituent material taken separately. The CHA molecular sieves in such blends include aluminosilicates having a low silica-to-alumina ratio (SAR) and silicoaluminophosphates (SAPOs).

The silica-to-alumina ratio (SAR) of some CHA aluminosilicates is associated with the molecular sieve's hydrothermal stability. For such aluminosilicates, a higher SAR corresponds to improved hydrothermal stability. However, blends of CHA SAPOs and low-SAR CHA aluminosilicates according to the present invention have surprisingly demonstrated hydrothermal stability under extreme aging conditions (e.g., 900° C.). Moreover, a synergistic effect between CHA SAPOs and low-SAR CHA aluminosilicates has been found that allows blends of these materials to unexpectedly achieve better performance compared to either material individually. This synergistic effect is also affected by the extra-framework metal loadings on the molecular sieves.

Accordingly, in one aspect provided is a catalyst composition comprising a blend of an aluminosilicate molecular sieve having a CHA framework and a silicoaluminophosphate molecular sieve having a CHA framework, wherein (a) the aluminosilicate molecular sieve and the silicoaluminophosphate molecular sieve are present an aluminosilicate:silicoaluminophosphate mole ratio of about 0.8:1.0 to about 1.2:1.0; and (b) said aluminosilicate molecular sieve contains a first extra-framework metal, said silicoaluminophosphate molecular sieve contains a second extra-framework metal, wherein said first and second extra-framework metals are independently selected from the group consisting of cesium, copper, nickel, zinc, iron, tin, tungsten, molybdenum, cobalt, bismuth, titanium, zirconium, antimony, manganese, chromium, vanadium, niobium, and combinations thereof, but preferably copper, wherein said first extra-framework metal is present in about 2 to about 4 weight percent, based on the weight of the aluminosilicate, and wherein the weight ratio of said first extra-framework metal and said second extra-framework metal is about 0.4:1.0 to about 1.5:1.0.

According to another aspect of the invention, provided is a method for treating NOx in a lean burn combustion exhaust gas comprising: (a) contacting an exhaust gas mixture having a lamba >1 and at least one NOx compound with a reductant and a catalyst comprising a blend of first molecular sieve having a CHA framework and a second molecular sieve having a CHA framework, wherein (i) said first molecular sieve is an aluminosilicate, said second molecular sieve is a silicoaluminophosphate, and said first and second molecular sieves are present in a mole ratio of about 0.8:1.0 to about 1.2:1.0, respectively; and (ii) said first molecular sieve contains a first exchanged metal, said second molecular sieve contains a second exchanged metal, wherein said first and second exchanged metals are independently selected from the group consisting of cesium, copper, nickel, zinc, iron, tin, tungsten, molybdenum, cobalt, bismuth, titanium, zirconium, antimony, manganese, chromium, vanadium, niobium, and combinations thereof, and wherein the weight ratio of said first exchanged metal and said second exchanged metal is about 0.4:1.0 to about 0.8:1.0; and (b) selectively reducing at least a portion of said NOx into N2 and H2O; wherein said contacting occurs at a temperature of about 200 to about 500° C., and optionally wherein said contacting occurs after the catalyst has been exposed to a temperature of at least about 800° C.

According to another aspect of the invention, provided is a catalytic article comprising (a) a catalyst comprising a blend of first molecular sieve having a CHA framework and a second molecular sieve having a CHA framework, wherein (i) said first molecular sieve is an aluminosilicate, said second molecular sieve is a silicoaluminophosphate, and said first and second molecular sieves are present in a mole ratio of about 0.8:1.0 to about 1.2:1.0, respectively; and (ii) said first molecular sieve contains a first exchanged metal, said second molecular sieve contains a second exchanged metal, wherein said first and second exchanged metals are independently selected from the cesium, copper, nickel, zinc, iron, tin, tungsten, molybdenum, cobalt, bismuth, titanium, zirconium, antimony, manganese, chromium, vanadium, niobium, and combinations thereof, and wherein the weight ratio of said first exchanged metal and said second exchanged metal is about 0.4:1.0 to about 0.8:1.0, and (b) a porous filter adapted for removing particulate from a disease exhaust gas, wherein said catalyst is disposed on and/or within said porous filter. In certain embodiments, article comprises the catalyst blend washcoated onto a flow-through or wall-flow monolith. In certain embodiments, the article comprises an extruded wall-flow filter produced from an extrudate containing the catalyst blend.

DETAILED DESCRIPTION OF PREFERRED
EMBODIMENTS OF THE INVENTION

In certain embodiments, the invention is directed to catalysts for improving environmental air quality, particularly for improving exhaust gas emissions generated by diesel and other lean burn engines. Exhaust gas emissions are improved, at least in part, by reducing $NO_x$ and/or $NH_3$ slip concentrations in lean burn exhaust gas over a broad operational temperature range. Accordingly, useful catalysts are those that selectively reduce $NO_x$ and/or oxidize ammonia in an oxidative environment (i.e., an SCR catalyst and/or AMOX catalyst).

Preferred catalysts of the present invention comprise a blend of metal-promoted molecular sieves having a CHA structure according to the IUPAC structural code specified by the International Zeolite Association (IZA). It will be appreciated that such molecular sieves include synthetic crystalline or pseudo-crystalline materials that are isotypes (isomorphs) of one another via their CHA Framework. Specific CHA isotypes that are useful in the present invention include, but are not limited to, DAF-5, LZ-218, Linde D, Linde R, Phi, SAPO-34, SAPO-44, SAPO-47, SSZ-13, SSZ-62, UiO-21, and ZK-14, with SAPO-34 and SSZ-13 being most preferred.

Preferred CHA molecular sieves include aluminosilicates and silicoaluminophosphates (SAPOs). As used herein, the term SAPO means a material composed of tetrahedron units of $PO_2^+$, $AlO_2^-$ and $SiO_2$ arranged in a three-dimensional, microporous, molecular sieve. Such SAPOs are mainly composed of silicon, aluminum, phosphorus and oxygen, but can be "metal-substituted" as described below. As used herein, the term "SAPO-34", means silicoaluminophosphates described as SAPO-34 in U.S. Pat. No. 4,440,871 (Lok) as well as any analog thereof. As used herein, the term "SSZ-13" means aluminosilicates described in U.S. Pat. No. 4,544,538 (Zones) as well as any analogs thereof. As used herein, the term "analogs" with respect to a CHA isotype means a molecular sieve having the same topology and essentially the same empirical formula, but are synthesized by a different process and/or have different physical features, such as different distributions of atoms within the CHA framework, different isolations of atomic elements within the molecular sieve (e.g., alumina gradient), different crystalline features, and the like.

Useful aluminosilicates may include framework metals other than aluminum, preferably a transition metal (also known as metal substituted aluminosilicates). As used herein, the term "metal substituted" with respect to a CHA aluminosilicate means the CHA framework has one or more aluminum or silicon framework atoms replaced by the substituted metal. In contrast, the term "metal exchanged" means a zeolite having extra-framework metal ions. Examples of metals suitable for substitution include copper and iron. Metal substituted silico-aluminophosphate (also referred to as MeAPSO) molecular sieves likewise have a framework in which the substituted metal has been inserted.

The CHA crystals of the present invention are not particularly limited by shape, however rhombohedral are preferred. In addition, preferred molecular sieves are highly crystalline.

In a particularly preferred embodiment, the catalyst comprises a blend of at least one aluminosilicate and at least one silicoaluminophosphate. As used herein, the term "blend" means a heterogeneous, preferably uniform, combination of two or more materials either of which could be used alone for the same or similar purpose as the blend. Preferred blends comprise an aluminosilicate molecular sieve having a CHA framework and a silicoaluminophosphate molecular sieve having a CHA framework, wherein the aluminosilicate molecular sieve and the silicoaluminophosphate molecular sieve are present in an aluminosilicate:silicoaluminophosphate mole ratio of about 0.5:1:0 to about 1.5:1.0, more preferably from about 0.8:1.0 to about 1.2:1.0.

Preferred aluminosilicates have a mole silica-to-alumina ratio (SAR) of less than about 35, more preferably about 10 to about 30, for example about 10 to about 25, from about 14 to about 20, from about 15 to about 18, and from about 20 to about 25. The SAR of aluminosilicate molecular sieves may be determined by conventional analysis. This ratio is meant to represent, as closely as possible, the ratio in the rigid atomic framework of the CHA crystal and to exclude silicon or aluminum in the binder or in cationic or other form within the channels. Since it may be difficult to directly measure the silica to alumina ratio of molecular sieve after it has been combined with a binder material, particularly an alumina binder, these silica-to-alumina ratios are expressed in terms of the SAR of the molecular sieve per se, i.e., prior to the combination of the molecular sieve with the other catalyst components.

In preferred embodiments, the CHA aluminosilicates and/or SAPOs are in the form of crystals having a mean crystal size of greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. Particularly preferred CHA aluminosilicates have a mean crystal size of about 1 to about 3 µm. Particularly preferred CHA silicoaluminophosphates have a mean crystal size of about 2 to about 5 µm. For embodiments wherein the catalyst blend is incorporated into an extrudable composition, the mean crystal size can be small, for example about 0.01 to about 1 µm.

Preferred SAPOs have a CHA structure and preferably have a strong:weak acid ratio and isolated acid sites.

In certain embodiments, particularly for applications involving the catalyst blend as an extrudate, at least a portion and preferably a majority of the SAPO crystals comprise an inert surface oxide layer. Preferably, the oxide layer is an amorphous oxide disposed as a layer on the crystal grain surface. It is understood that the coated crystal grain comprises a body portion having a CHA framework and an oxide surface portion, each of which have separate compositional features. Composition of the body portion can be considered to be approximately the same as that of a corresponding uncoated crystal grain because the oxide layer is very thin. The oxide layer mainly comprises oxides of silicon, aluminum and phosphorus, but may contain elements other than silicon, aluminum and phosphorus.

The oxide layer preferably has a silicon-to-aluminum ratio (Si:Al) greater than the crystal body itself. By way of example, embodiments in which the SAPO crystal body has a Si:Al of about 0.05 to about 0.3, the corresponding oxide layer on the crystal surface can have a Si:Al of about 0.5 or more (e.g., from about 0.5 to about 3.5). Also, the oxide layer on the crystal grain surface preferably has an atomic silicon-to-phosphorus ratio (Si:P) of 0.55 or more. Each of these parameters can be measured by XPS (X-ray photoelectron spectroscopy) or with an energy dispersive X-ray (EDX) analyzer. Other preferred SAPO crystal grains have an Si:Al of about 0.1 to about 0.2 and a corresponding oxide layer having a Si:Al of about 0.6 to about 2 and a Si:P of about 0.6 to about 3. In general, the Si/Al and Si/P atomic ratios of the surface oxide layer increase with the thickness of the amorphous oxide layer. In certain embodiments the layer has a thickness of about 3 to about 20 nm (such as about 5 to about 15 nm, about 5 to about 10 nm, and about 10 to about 15 nm).

The amorphous oxide layer is formed after crystallization of the SAPO crystal grain body is almost completed. Methods for making such coated SAPO materials can be found, for example, in EP 1512667.

The CHA aluminosilicate crystals in the catalyst composition can be individual crystals, agglomeration of crystals, or a combination of both, provided that agglomeration of crystals have a mean particle size of less than about 15 µm, preferably less than about 10 µm, and more preferably less than about 5 µm. The lower limit on the mean particle size of the agglomeration is the composition's mean individual aluminosilicate crystal size.

Crystal size (also referred to herein as the crystal diameter) is the length of one edge of a face of the crystal. For example, the morphology of chabazite crystals is characterized by rhombohedral faces wherein each edge of the face is approximately the same length. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of molecular sieve powder on a suitable mount such that individual particles are reasonably evenly spread out across the field of view at 1000× to 10,000× magnification. From this population, a statistically significant sample of random individual crystals (e.g., 50-200) is examined and the longest dimensions of the individual crystals parallel to the horizontal line of the straight edge are measured and recorded. (Particles that are clearly large polycrystalline aggregates should not be included the measurements.) Based on these measurements, the arithmetic mean of the sample crystal sizes is calculated.

Particle size of an agglomeration of crystals can be determined in a similar manner except that instead of measuring the edge of a face of an individual crystal, the length of the longest side of an agglomeration is measured. Other techniques for determining mean particle size, such as laser diffraction and scattering can also be used.

As used herein, the term "mean" with respect to crystal or particle size is intended to represent the arithmetic mean of a statistically significant sample of the population. For example, a catalyst comprising molecular sieve crystals having a mean crystal size of about 0.5 to about 5.0 µm is catalyst having a population of the molecular sieve crystals, wherein a statistically significant sample of the population (e.g., 50 crystals) would produce an arithmetic mean within the range of about 0.5 to about 5.0 µm.

In addition to the mean crystal size, catalyst compositions preferably have a majority of the crystal sizes that are greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. Preferably, the first and third quartile of the sample of crystals sizes is greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm.

As used herein, the term "first quartile" means the value below which one quarter of the elements are located. For example, the first quartile of a sample of forty crystal sizes is the size of the tenth crystal when the forty crystal sizes are arranged in order from smallest to largest. Similarly, the term "third quartile" means that value below which three quarters of the elements are located. Large crystal CHA zeolites, such as the isotype SSZ-13, can be synthesized by known processes, such as those described in WO 2010/043981 (which is incorporated herein by reference) and WO 2010/074040 (which is incorporated herein by reference).

Molecular sieves in the present invention include those that have been treated to improve hydrothermal stability. Conventional methods of improving hydrothermal stability include: (i) dealumination by steaming and acid extraction using an acid or complexing agent e.g. (EDTA—ethylenediaminetetracetic acid); treatment with acid and/or complexing agent; treatment with a gaseous stream of $SiCl_4$ (replaces Al in the zeolite framework with Si); and (ii) cation exchange—use of multi-valent cations such as lanthanum (La).

Preferably, the molecular sieves of the present invention are promoted with one or more metals. As used herein, the term "metal promoted" with respect to a molecular sieve means a molecular sieve loosely holding one or more metal ions, such as copper, to the molecular sieve's framework as an extra-framework metal. An "extra-framework metal" is one that resides within the molecular sieve and/or on at least a portion of the molecular sieve surface, does not include aluminum, and does not include atoms constituting the framework of the molecular sieve.

In preferred embodiments, the catalyst comprises a CHA aluminosilicate molecular sieve that contains a first extra-framework metal, a CHA SAPO molecular sieve that contains a second extra-framework metal, wherein the first and second extra-framework metals are independently selected from the group consisting of cesium, copper, nickel, zinc, iron, tin, tungsten, molybdenum, cobalt, bismuth, titanium, zirconium, antimony, manganese, chromium, vanadium, niobium, and combinations thereof. More preferred extra-framework metals include those selected from the group consisting of cesium, manganese, iron, and copper, and mixtures thereof. Preferably, at least one of the extra-framework metals is copper. Preferably, both the first and second extra-framework metals are copper. Other preferred extra-framework metals include iron and/or cerium, particularly in combination with copper. The extra-framework metal can be added to the molecular sieve via any known technique such as ion exchange, impregnation, isomorphous substitution, etc. Preferably, the first extra-framework metal is present in about 2 to about 4 weight percent, based on the weight of the aluminosilicate, and wherein the weight ratio of the first extra-framework metal and the second extra-framework metal is, respectively, about 0.4:1.0 to about 0.8:1.0.

In certain embodiments, the first extra-framework metal is present in an amount of about 1 to about 5 wt % based on the total weight of the aluminosilicate molecular sieve, for example from about 1.5 wt % to about 4.5 wt %, from about 2 to about 4 wt %, from about 2 to about 3 wt %, or from about 2.2 to about 2.7 wt %. In certain embodiments, the extra-framework metal (M), preferably copper, is present in the aluminosilicate in an amount to produce a M:Al atomic ratio of about 0.17 to about 0.24, preferably about 0.22 to about 0.24, particularly when the aluminosilicate has an SAR of about 15 to about 20. In certain embodiments that include exchanged copper, the copper is present in an amount from about 80 to about 120 $g/ft^3$ of zeolite, including for example about 86 to about 94 $g/ft^3$, or about 92 to about 94 $g/ft^3$.

Preferably, the second extra-framework metal is present in the SAPO in amount sufficient to achieve a weight ratio of the first extra-framework metal and the second extra-framework metal of about 0.4:1.0 to about 1.5:1.0, for example about 1.3:1 to about 1.1:1.0, about 0.4:1.0 to about 0.8:1.0, and about 0.5:1.0 to about 0.7:1.0.

In one example, a metal-exchanged molecular sieve is created by blending the molecular sieve into a solution containing soluble precursors of the catalytically active metal. The pH of the solution may be adjusted to induce precipitation of the catalytically active cations onto or within the molecular sieve structure. For example, in a preferred embodiment a molecular sieve powder is immersed in a solution containing copper nitrate for a time sufficient to allow incorporation of the catalytically active copper cations into the molecular sieve structure by ion exchange. Unexchanged copper ions are precipitated out. Depending on the application, a portion of the unexchanged ions can remain in the molecular sieve material as free copper. The metal-substituted molecular sieve may then be washed, dried and calcined.

Generally, ion exchange of the catalytic metal cation into or on the molecular sieve may be carried out at room temperature or at a temperature up to about 80° C. over a period of about 1 to 24 hours at a pH of about 7. The resulting catalytic molecular sieve material is preferably dried at about 100 to 120° overnight and calcined at a temperature of at least about 550° C.

Certain embodiments of the present invention contain a relatively large amount of Ce and have surprisingly good performance. In particular, the CHA aluminosilicate, having an SAR of less than 30, preferably about 15 to about 20, that is promoted with a metal, preferably copper and preferably in a copper:aluminum ratio of about 0.17 to about 0.24, and has a Ce concentration of greater than 1.35 weight percent, preferably 1.35 to 13.5 weight percent, based on the total weight of the aluminosilicate. Examples of preferred concentrations include above about 2.5 weight percent, above about 5 weight percent, above about 8 weight percent, above about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite. For most of these ranges, the improvement in catalyst performance correlates directly to the concentration of Ce in the catalyst. These ranges are particularly preferred for copper promoted aluminosilicates having an SAR of about 10 to about 25, about 20 to about 25, about 15 to about 20, or about 16 to about 18, and more preferably for such embodiments, wherein the copper is present in a copper-to-aluminum ratio of about 0.17 to about 0.24.

In certain embodiments, the cerium concentration in the catalyst material is about 50 to about 550 $g/ft^3$. Other ranges of Ce include: above 100 $g/ft^3$, above 200 $g/ft^3$, above 300 $g/ft^3$, above 400 $g/ft^3$, above 500 $g/ft^3$, from about 75 to about 350 $g/ft^3$, from about 100 to about 300 $g/ft^3$, and from about 100 to about 250 $g/ft^3$.

In certain embodiments, the concentration of Ce exceeds the theoretical maximum amount available for exchange on the metal-promoted zeolite. Accordingly, in some embodiments, Ce is present in more than one form, such as Ce ions, monomeric ceria, oligomeric ceria, and combinations thereof, provided that said oligomeric ceria has a mean crystal size of less than 5 μm, for example less than 1 μm, about 10 nm to about 1 μm, about 100 nm to about 1 μm, about 500 nm to about 1 μm, about 10 to about 500 nm, about 100 to about 500 nm, and about 10 to about 100 nm. As used herein, the term "monomeric ceria" means $CeO_2$ as individual molecules or moieties residing freely on and/or in the zeolite or weakly bonded to the zeolite. As used herein, the term "oligomeric ceria" means nanocrystalline $CeO_2$ residing freely on and/or in the zeolite or weakly bonded to the zeolite.

Cerium is preferably incorporated into a CHA aluminosilicate containing a promoting metal. For example, in a preferred embodiment, a CHA aluminosilicate undergoes a copper exchange process prior to being impregnated by Ce. An exemplary Ce impregnation process involves adding Ce nitrate to a copper promoted zeolite via a conventional incipient wetness technique.

Treatment of Exhaust Gases:

The catalyst compositions described herein can promote the reaction of a reductant, such as ammonia, with nitrogen oxides to selectively form elemental nitrogen ($N_2$) and water ($H_2O$) notwithstanding the competing reaction of oxygen and ammonia. In one embodiment, the catalyst can be formulated to favor the reduction of nitrogen oxides with ammonia (i.e., and SCR catalyst). In another embodiment, the catalyst can be formulated to favor the oxidation of ammonia with oxygen (i.e., an ammonia oxidation (AMOX) catalyst). In yet another embodiment, an SCR catalyst and an AMOX catalyst are used in series, wherein both catalyst comprise the catalyst blend described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst or a non-PGM catalyst.

Preferably, the AMOX catalyst is disposed on a high surface area support, including but not limited to alumina. In certain embodiments, the AMOX catalyst is applied to a substrate, preferably substrates that are designed to provide large contact surface with minimal backpressure, such as flow-through metallic or cordierite honeycombs. For example, a preferred substrate has between about 25 and about 300 cells per square inch (CPSI) to ensure low backpressure. Achieving low backpressure is particularly important to minimize the AMOX catalyst's effect on the low-pressure EGR performance. The AMOX catalyst can be applied to the substrate as a washcoat, preferably to achieve a loading of about 0.3 to 2.3 $g/in^3$. To provide further $NO_x$ conversion, the front part of the substrate can be coated with just SCR coating, and the rear coated with SCR and an $NH_3$ oxidation catalyst which can further include Pt or Pt/Pd on an alumina support. The AMOX catalyst can be used as an Ammonia Slip Catalyst (ASC) when located downstream of the SCR catalyst.

With respect to an SCR process, provided is a method for the reduction of $NO_x$ compounds in an exhaust gas, which comprises contacting the exhaust gas with the catalyst composition described herein and in the presence of a reductant for a time and temperature sufficient to catalytically reduce $NO_x$ compounds thereby lowering the concentration of $NO_x$ compounds in the exhaust gas. In one embodiment, nitrogen oxides are reduced with the reductant at a temperature of at least about 100° C. In another embodiment, the nitrogen oxides are reduced with the reductant at a temperature from about 150° C. to about 750° C. In a particular embodiment, the temperature range is from about 150 to about 550° C. In another embodiment, the temperature range is from about 175 to about 450° C. In yet another embodiment, the temperature range is about 650 to about 900° C., such as about 650 to about 850° C., or about 750 to about 850° C. The amount of $NO_x$ reduction is dependent upon the contact time of the exhaust gas stream with the catalyst, and thus is dependent upon the space velocity. The contact time and space velocity is not particularly limited in the present invention. However, the present catalyst blends of the present invention have shown increased $NO_x$ reduction compared to conventional SCR catalysts. As such, the catalyst blends can perform well even at high space velocity which is desirable in certain applications.

The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea (($NH_2)_2$ CO), ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred. The addition of nitrogenous reductants can be controlled so that $NH_3$ at the catalyst inlet is controlled to be 60% to 200% of theoretical ammonia calculated at 1:1 $NH_3/NO$ and 4:3 $NH_3/NO_2$. In embodiments, the ratio of nitrogen monoxide to nitrogen dioxide in the catalyst inlet gas is from 4:1 to 1:3 by volume. In this regard, the ratio of nitrogen monoxide to nitrogen dioxide in the gas can be adjusted by oxidizing nitrogen monoxide to nitrogen dioxide using an oxidation catalyst located upstream of the catalyst.

In another embodiment, all or at least a portion of the nitrogen-based reductant, particularly $NH_3$, can be supplied by a $NO_x$ adsorber catalyst (NAC), a lean $NO_x$ trap (LNT), or a NOx storage/reduction catalyst (NSRC), disposed upstream of the dual function catalytic filter. For example, under certain conditions, such as during the periodically rich regeneration events, $NH_3$ may be generated over a $NO_x$ adsorber catalyst. The SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as 20 to 60 $g/ft^3$. Alternatively, the precious metal of the catalyst is characterized by the average concentration which may be from about 40 to about 100 $grams/ft^3$.

The methods of the present invention can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

Catalytic Articles:

Typical applications using the SCR and AMOX catalysts of the present invention involve heterogeneous catalytic reaction systems (i.e., solid catalyst in contact with a gas and/or liquid reactant). To improve contact surface area, mechanical stability, and fluid flow characteristics, the catalysts can be supported on a substrate. For example, the catalyst compositions of the present invention can be in the form of a washcoat, preferably a washcoat that is suitable for coating a substrate such as a metal or ceramic flow through monolith substrate or a filtering substrate, such as a wall-flow filter or sintered metal or partial filter. Accordingly, another aspect of the invention is a washcoat comprising a catalyst component as described herein. In addition to the catalyst component, washcoat compositions can further comprise other, non-catalytic components such as carriers, binders, stabilizers, and promoters. These additional components do not necessarily catalyze the desired reaction, but instead improve the catalytic material's effectiveness, for example by increasing its operating temperature range, increasing contact surface area of the catalyst, increasing adherence of the catalyst to a substrate, etc. Examples of such optional, non-catalytic components can include non-doped alumina, titania, non-zeolite silica-alumina, ceria, and zirconia that are present in catalyst composition, but serve one or more non-catalytic purposes. For embodiments in which the molecular sieve in the catalyst contains Ce, the corresponding washcoat may further comprise a binder containing Ce or ceria. For such embodiments, the Ce containing particles in the binder are significantly larger than the Ce containing particles in the catalyst.

Washcoat composition, and particularly extrudable compositions, may also include fillers and pore formers such as crosslinked starch, non-crosslinked starch, graphite, and combinations thereof.

Preferred substrates, particular for mobile applications, include wall-flow filters, such as wall-flow ceramic monoliths, and flow through filters, such as metal or ceramic foam or fibrous filters. In addition to cordierite, silicon carbide, silicon nitride, ceramic, and metal, other materials that can be used for the porous substrate include aluminum nitride, silicon nitride, aluminum titanate, α-alumina, mullite e.g., acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate. In a preferred embodiment, the substrate is a flow-through monolith comprising many channels that are separated by thin porous walls, that run substantially parallel in an axial direction over a majority of the length of the substrate body, and that have a square cross-section (e.g., a honeycomb monolith). The honeycomb shape provides a large catalytic surface with minimal overall size and pressure drop.

The coating process may be carried out by methods known per se, including those disclosed in EP 1 064 094, which is incorporated herein by reference.

Catalyst compositions of the present invention are particularly suited for applications in which the substrate is a diesel particulate filter (DPF) or other soot filter, such as a catalyzed soot filter (CSF). In such embodiments, the filter substrate includes an SCR catalyst zone so that exhaust gas passing through the filter also contacts the SCR catalyst, thus eliminating a major portion of the NOx components from the exhaust gas. Applying an SCR catalyst to a filter substrate advantageously reduces the number of components & component size in the exhaust system (i.e., separate filter and SCR components are combined into one unit) and reduces costs. However, some conventional high-performance SCR catalysts are not hydrothermally stable at the high temperatures encountered during active regeneration of the filter. The SCR catalysts of the present invention are hydrothermally stable to temperatures of at least 900° C., and therefore are well suited for such applications.

During normal operation of a diesel exhaust system equipped with a DPF or CSF, the soot and other particulates accumulate on the upstream sides of the filter which lead to an increase in backpressure. To alleviate this increase in backpressure, the filter substrates are continuously or periodically regenerated (i.e., active regeneration). One form of active filter regeneration involves intermittently introducing additional hydrocarbon fuel into the exhaust gas and combusting that fuel to heat the filter to a temperature required for adequate combustion of the accumulated soot. The requisite soot combustion temperature can be reduced (for example, to about 600° C.) by coating the filter with a suitable combustion-promoting catalyst (soot oxidation catalyst). However, if during an active regeneration event, a period of low exhaust gas flow occurs, e.g. when the engine/vehicle is caused to idle, the reduced gas flow prevents heat from being removed from the CSF. This can result in parts of the filter reaching temperatures in excess of 1000° C.

The high hydrothermal stability of the SCR catalyst of the present invention allows more soot to be trapped on the filter before active regeneration is required. Less frequent active regeneration leads to improved fuel economy. Moreover, the high hydrothermal stability of the SCR catalyst removes the need for the soot oxidation catalyst coating on the filter. Forgoing this additional catalyst layer reduces backpressure and increases filter efficiency and fuel economy. Thus, in one embodiment, provided is a filter substrate comprising a CSF zone and an SCR zone. In another embodiment, an SCR catalyst of the present invention is applied to an otherwise bare DPF, preferably in a zone on the downstream side of the filter.

Figure 1:
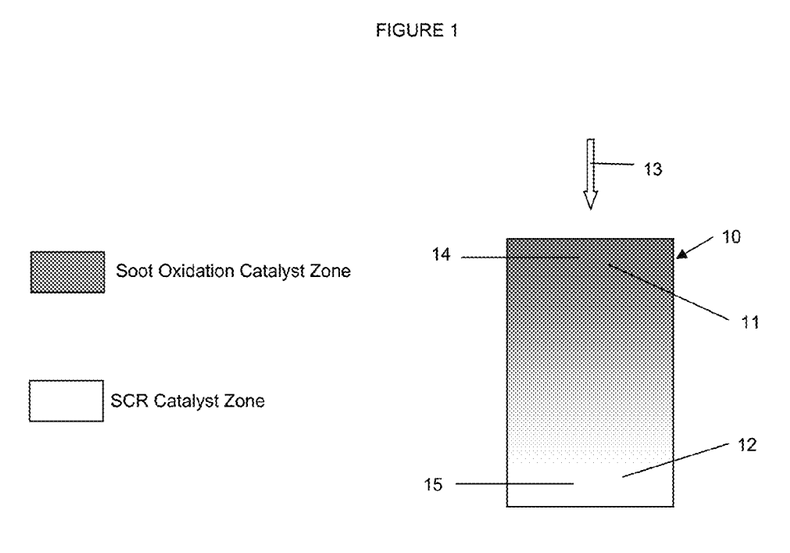
FIG. 1 is a diagram of a catalyst article according to an embodiment of the present invention, the filter having an inlet coated with a soot oxidation catalyst zone and an outlet coated with an SCR catalyst zone.

Turning to FIG. 1, shown is an embodiment of the invention comprising a filter substrate 10, such as a diesel particular filter, having an inlet 14 and an outlet 15 relative to the direction of exhaust gas flow 13 through the filter. The filter inlet comprises a soot oxidation zone 14, while the filter outlet comprises an SCR zone 15. As used herein, the term "zone" means a catalytic area within and/or on the filter substrate. For example, a zone can be an area of the filter substrate in which a catalyst has permeated or a catalyst layer residing on top of and/or within filter substrate. The zone can be a discrete area, completely separated from other zones, can be adjacent to, or overlap with, other zones, or can be partially fused into other zones. The term "inlet" means the side, face, surface, channel, and/or portion of the filter into which an exhaust gas typically flows from an external source. The term "outlet" means the side, face, surface, channel, and/or portion of the filter from which an exhaust gas typically exits the filter. The phrase "on the inlet" and "on the outlet", with respect to the orientation of a catalytic zone and a filter substrate, is meant to include a catalyst residing as a zone or layer on top of the substrate face and/or within the substrate walls (i.e., within the pores of the substrate walls).

Figure 2:
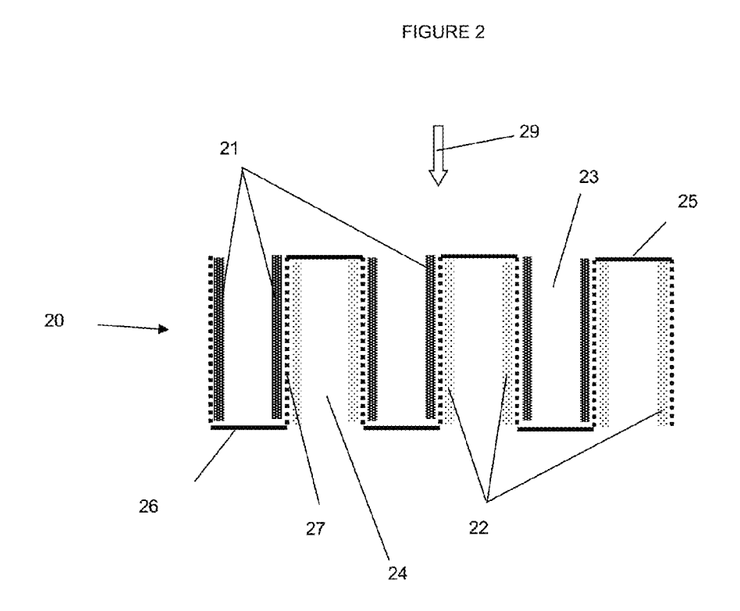
FIG. 2 is a diagram of a wall-flow soot filter according to an embodiment of the present invention, the filter having an inlet coated with a soot oxidation catalyst zone and an outlet coated with an SCR catalyst zone.

In another preferred embodiment, the substrate is a porous wall-flow filter which is similar to the honeycomb monolith, but having channels that are open and capped at alternate ends in a checkerboard fashion. This way the particle laden exhaust gases are forced to flow through the walls. Gas is able to escape through the pores in the wall material. FIG. 2 shows a wall-flow filter 20 having inlet channels 23 and outlet channels 24 which are defined by a gas permeable walls 27 and gas impermeable inlet caps 25 and outlet caps 26. Particulates, however, are too large to escape and are trapped on and/or in the filter walls. Exhaust gas having a direction of flow 29 enters the filter 20 via one or more of the inlet channels 23, passes through the gas permeable walls 27 which separate the inlet and outlet channels, and then exits the filter via the outlet channels 24. The exhaust gas entering the inlet channels typically comprises soot, $NO_x$, and preferably also contains a nitrogenous reducing agent, such as $NH_3$, which is used to convert the $NO_x$ into other gases via an SCR reaction. As the exhaust gas passes through the gas permeable wall, at least a portion of the particulate matter in the exhaust gas is trapped at the inlet where it contacts the soot oxidation zone. The soot oxidation zone facilitates a low-temperature oxidation reaction wherein solid, carbonaceous particles of the soot are converted into gases, such as $CO_2$ and water vapor, which then pass through the gas permeable filter wall. As the exhaust gas passes through the SCR catalyst zone, at least a portion of the $NO_x$ reacts with $NH_3$ in the presence of the SCR catalyst, wherein the $NO_x$ is reduced to $N_2$ and other gases.

The respective orientation of the soot oxidation zone and the SCR zone are not particularly limited provided that a majority of the targeted particulate matter contacts the soot oxidation zone in a manner sufficient for soot combustion. Thus, in certain embodiments the two zones partially or completely overlap. In other embodiments, the two zones converge between the inlet and outlet, while in other embodiments they are spatially separated. The zones on the inlet and outlet may exist as a coating on the surface of the filter substrate or may diffuse or permeate into all or a portion of the filter substrate. In a particularly preferred embodiment, the soot oxidation zone and the SCR zone permeate into opposite sides of the wall of a wall-flow filter. That is, the soot oxidation zone is created via the soot oxidation catalyst permeating into the wall from the inlet channel side of the wall and the SCR zone is created via the SCR catalyst permeating into the wall from the outlet channel side of the wall.

The catalyst in the CSF typically comprises at least one platinum group metal (PGM), but in particular embodiments it comprises Pt either alone or in combination with one or more additional PGM, such as both Pt and Pd or both Pt and RJi or all three of Pt, Pd and RJi including suitable promoters such as Mg, Ba or rare earth metals such as Ce. The material from which filter substrate monolith is made can support the catalyst or it can be supported on a surface area increasing washcoat component, e.g. particulate alumina, titania, non-zeolite silica-alumina, ceria, zirconia and mixtures, composite oxides and mixed oxides of any two or more thereof. Typical Pt loadings range from about 50 g $Pt/ft^3$ to about 150 $Pt/ft^3$.

The total amount of soot oxidation catalyst component in the soot oxidation zone will depend on the particular application, but could comprise about 0.1 to about 15 $g/in^3$, about 1 to about 7 $g/in^3$, about 1 to about 5 $g/in^3$, about 2 to about 4 $g/in^3$, or about 3 to about 5 $g/in^3$ of the soot oxidation catalyst component. The total amount of SCR catalyst component in the SCR zone will depend on the particular application, but could comprise about 0.1 to about 15 $g/in^3$, about 1 to about 7 $g/in^3$, about 1 to about 5 $g/in^3$, about 2 to about 4 $g/in^3$, or about 3 to about 5 $g/in^3$ of the SCR catalyst. Preferred washcoat loading for the SCR catalyst is from about 0.1 to about 0.5 $g/in^3$.

The actual shape and dimensions of the filter substrate, as well as properties such as channel wall thickness, its porosity, etc., depend on the particular application of interest. Wall flow filter useful in the present invention have up to about 700 channels (cells) per square inch of cross section. In one embodiment, the wall-flow filter contains about 100 to 400, cells per square inch ("cpsi").

Particular combinations of filter mean pore size, porosity, pore interconnectivity, and washcoat loading can be combined to achieve a desirable level of particulate filtration and catalytic activity at an acceptable backpressure. In certain embodiments, the washcoat loading on the porous substrate is >0.25 $g/in^3$, such as >0.50 $g/in^3$, or >0.80 $g/in^3$, e.g. 0.80 to 3.00 $g/in^3$. In preferred embodiments, the washcoat loading is >1.00 $g/in^3$, such as >1.2 $g/in^3$, >1.5 $g/in^3$, >1.7 $g/in^3$ or >2.00 $g/in^3$ or for example 1.5 to 2.5 $g/in^3$.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

Pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 5 to 50 µm, for example about 10 to about 40 µm, about 20 to about 30 µm, about 10 to about 25 µm, about 10 to about 20 µm, about 20 to about 25 µm, about 10 to about 15 µm, and about 15 to about 20 µm. In other embodiments, the mean pore size of the filter is about 10 to about 200 nm.

Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns. Preferred porosity for cordierite filters is from about 60 to about 75%.

The soot oxidation zone and SCR zone can be incorporated into the soot filter by any practical means. For example, the inlet channels of a wall-flow soot filter can be dipped into an soot oxidation catalyst composition at a depth and for a period of time that will allow the soot oxidation catalyst composition to permeate the filter walls to a certain depth and/or concentration. Additional techniques, such as application of pressure or a vacuum, can be used to promote adequate, even, and/or more rapid permeation of a particular coating. After the soot oxidation catalyst composition permeates the inlet of the wall-flow filter, the filter is dried and then the outlet channels of the filter are dipped into an SCR catalyst composition at a depth and for a period of time that will allow the SCR catalyst composition to permeate the filter walls to a certain depth and/or concentration. Again, additional techniques, such as application of pressure or a vacuum, can be used to promote adequate, even, and/or more rapid permeation of a particular coating. The SCR zone is then dried. One or more of the dipping processes can be repeated to achieve the desired coating level. After acceptable catalyst loadings are obtained, the catalytic coating is activated, preferably at a temperature of about 100 to about 300° C. for about 1 to about 3 hours. The activated filter is calcined to remove additional moisture at a temperature of about 450 to about 550° C. for about 1 to about 3 hours. The drying and calcining steps preferably performed as per standard CSF preparation conditions.

In certain embodiments, the catalyst blends of the present invention are incorporated into an extruded article, such as an extruded flow-through filter, instead of being coated on a substrate. Extruded filters using the catalyst blends of the present invention are advantageous in that they have lower backpressure, have more uniform catalyst distribution, are more durable, can achieve higher catalyst loadings, and/or can have the same effectiveness with lower catalyst loading, compared to filters coated with a catalyst washcoat. Preferred extruded catalytic filters have about 100 to about 400 cells per inch, a wall thickness of about 7 to about 15 mils, and a porosity of at least about 50%, for example about 55 to about 75%, or about 60 to about 70%.

System:

Another aspect of the invention is directed to a system for treating lean-burn exhaust gas. Such exhaust gas systems are configurations of two or more discrete devices or components, each of which are capable of modifying the composition of the exhaust gas independently of the other(s), but interact with the other(s) to form a coherent scheme for treating the exhaust gas. Preferably, one or more of the components of the exhaust gas system interact to produce a synergistic result.

In a preferred embodiment, the system of the present invention comprises a catalytic soot filter as described herein in fluid communication with an injector or other device for introducing a nitrogenous reductant into the exhaust gas, wherein the injector or other device is disposed upstream of the filter. In certain embodiments, the system further comprises an exhaust gas stream generated by a lean burn internal combustion engine, one or more conduits for carrying a flowing exhaust gas, wherein the conduits are in fluid connection with at least some of the components of the exhaust system, and/or a source of nitrogenous reductant.

The injector can continuously, periodically, or intermittently introduce the reductant, such gaseous ammonia, ammonia in aqueous solution, aqueous urea, or ammonia from an ammonia generator, into the exhaust gas at a dose effective for optimization of the downstream SCR reaction. The injector is in fluid communication with the exhaust gas stream and may be attached, connected to, and/or integrated with a conduit, such as a pipe, for directing the exhaust through at least a portion of the exhaust gas system. The injector may also be in fluid communication with a reduction agent supply tank to provide for repeated injections of the reduction agent.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$. The control means can comprise a pre-programmed processor such as an electronic control unit (ECU). Controlling the metering involves limiting the introduction of the nitrogenous reductant into the flowing exhaust gas only when it is determined that the SCR catalyst is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In certain embodiments, the system further comprises a diesel oxidation catalyst (DOC) to oxidize hydrocarbon based soluble organic fraction (SOF) and carbon monoxide content of diesel exhaust by simple oxidation:

$$CO + \tfrac{1}{2}O_2 \rightarrow CO_2$$

$$[HC] + O_2 \rightarrow CO_2 + H_2O$$

The DOC may also serve to oxidize NO into $NO_2$, which in turn, may be used to oxidize particulate matter in particulate filter. Additionally, the DOC may serve to reduce the particulate matter (PM) in the exhaust gas.

Preferably, the DOC is disposed upstream of the upstream of the SCR catalyst, and more preferably upstream of the SCR reductant injector or NAC.

In a further embodiment, an oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. In another embodiment, the system further comprises a Closed Coupled Catalyst (CCC) upstream of the DOC.

The oxidation catalyst can include at least one platinum group metal (or some combination of these), such as platinum, palladium, or rhodium, coated on a flow-through monolith substrate. Other metal catalysts that can be used in the DOC include aluminum, barium, cerium, alkali metals, alkaline-earth metals, rare-earth metals, or any combinations thereof. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia. In a preferred embodiment, the diesel oxidation catalyst composition contains about 10 to 120 g/ft³ of a platinum group metal (e.g., platinum, palladium or rhodium) dispersed on a high surface area, refractory oxide support (e.g., γ-alumina).

In certain embodiments, one or more additional SCR catalyst components can be included in the system, preferably downstream of the SCR catalytic filter, to further reduce the concentration of $NO_x$ in the exhaust gas. For example, upon exiting the catalytic filter, the exhaust gas passes through a flow-through substrate coated with an SCR catalyst. Thus, the flow-through SCR catalyst is disposed downstream of the SCR coated filter. The $NO_x$ concentration of the exhaust gas is reduced as the gas passes through the filter and then is further reduced as the gas sequentially passes through the one or more SCR flow-through substrates. In another embodiment, the system further comprises an additional reductant injector upstream of the SCR flow-through catalyst and downstream of the dual function catalytic filter. In certain embodiments, the one or more downstream SCR flow-through catalyst are extruded articles.

The number of additional SCR catalyst flow-through components can be of any practical number, such as 1, 2, 3, or 4. The downstream SCR catalyst(s) may be the same or different from the SCR catalyst coated on the SCR coated filter.

In certain embodiments, the system further comprises an ammonia slip catalyst (ASC) disposed downstream of the dual function catalytic filter, and in some embodiments, downstream of the flow-through SCR components. The ASC serves to oxidize most, if not all, of the ammonia prior to emitting the exhaust gas into the atmosphere or passing the exhaust gas through a recirculation loop prior to exhaust gas entering/re-entering the engine. Thus, the ASC reduces the concentration of ammonia slip from the SCR reaction, the release of ammonia from the catalyst surface during rapid temperature increases, or from the use of a stoichiometric excess of reductant. Preferably, the ASC material should be selected to favor the oxidation of ammonia instead of the formation of $NO_x$ or $N_2O$. Preferred catalyst materials include platinum, palladium, or a combination thereof, with platinum or a platinum/palladium combination being preferred. Preferably, the catalyst is disposed on a high surface area support, including but not limited to alumina. In certain embodiments, the ASC is applied to a substrate, preferably substrates that are designed to provide large contact surface with minimal backpressure, such as flow-through metallic or cordierite honeycombs. For example, a preferred substrate has between about 25 and about 300 cells per square inch (CPSI) to ensure low backpressure. Achieving low backpressure is particularly important to minimize the ASC's effect on the low-pressure EGR performance. The ASC can be applied to the substrate as a washcoat, preferably to achieve a loading of about 0.3 to 2.3 g/in$^3$. To provide further $NO_x$ conversion, the front part of the substrate can be coated with just SCR coating, and the rear coated with SCR and an $NH_3$ oxidation catalyst such as Pt or Pt/Pd on an alumina support.

Methods of the present invention may also comprise one or more of the following steps: (a) accumulating and/or combusting soot that is in contact with the inlet of a catalytic filter; (b) introducing a nitrogenous reductant into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reductant to reduce the $NO_x$ concentration in the exhaust gas; and (f) contacting the exhaust gas with an AMOX catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

EXAMPLE

Example 1

About 100 grams of commercially available CHA aluminosilicate (SSZ-13) that was loaded with about 2.41 weight percent copper (based on the total weight of the aluminosilicate) was blended with about 100 grams commercially available CHA silicoaluminophosphate (SAPO-34) that was loaded with about 4.18 weight percent copper (based on the total weight of the silicoaluminophosphate) to form a blended powder.

Figure 3:
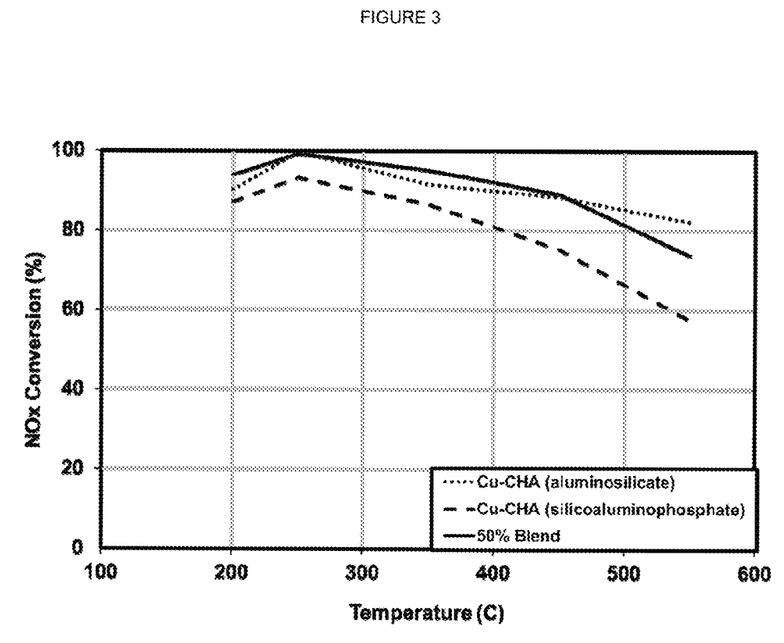
FIG. 3 is a graph depicting comparative NOx conversation data of a fresh catalyst blend according to an embodiment of the invention and NOx conversation data of the blend's constituent materials.

The powder blend was exposed to a simulated diesel engine exhaust gas that contained NOx and that was combined with ammonia. The catalyst's capacity for $NO_x$ conversion was determined at temperatures ranging from 200° C. to 550° C. For comparison, samples of similarly prepared Cu:SSZ-13 and Cu:SAPO-34 were analyzed individually under similar conditions. FIG. 3 shows that all three samples had high fresh performance over the entire temperature window.

A powder blend prepared as above and separate samples of Cu:SSZ-13 and Cu:SAPO-34 were aged at about 900° C. in the presence of about 4.5% water for four hours.

Figure 4:
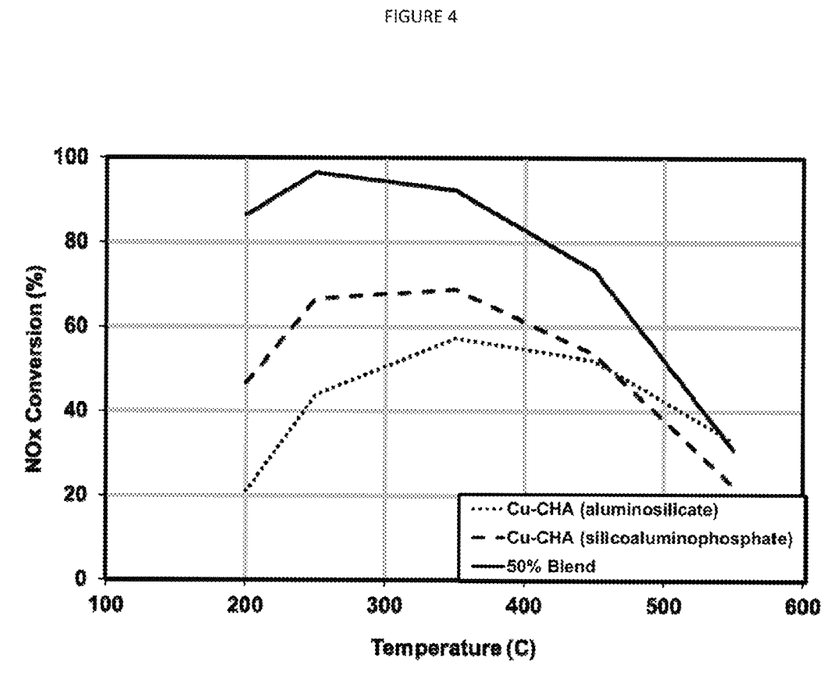
FIG. 4 is a graph depicting comparative NOx conversation data of an aged catalyst blend according to an embodiment of the invention and NOx conversation data of the blend's constituent materials.

The aged samples were exposed to a simulated diesel engine exhaust gas that contained NOx and that was combined with ammonia. The catalyst samples' capacity for $NO_x$ conversion was determined at temperatures ranging from 200° C. to 550° C. FIG. 4 shows the hydrothermally aged $NO_x$ conversion of the three catalysts. Both the aluminosilicate and silicoaluminophosphate catalysts alone show significant degradation after this aging; however, a blend of the two components shows significantly higher conversion over the entire temperature window.

What is claimed is:

1. A catalyst composition comprising a blend of two molecular sieve materials each having a CHA structure, wherein the first molecular sieve has a first silica-to-alumina ratio (SAR) of about 10-25 and contains a first extra-framework metal, the second molecular sieve has second SAR of about 20-35 and contains a second extra-framework metal, and wherein said first and second SAR are different and said first and second extra-framework metals are independently selected from the group consisting of cesium, copper, nickel, zinc, iron, tin, tungsten, molybdenum, cobalt, bismuth, titanium, zirconium, antimony, manganese, chromium, vanadium, niobium, and combinations thereof.

2. The catalyst of claim 1, wherein the two molecular sieve materials are aluminosilicates.

3. The catalyst of claim 1, wherein said first and second exchanged metals are independently selected from the group consisting of copper and iron.

4. The catalyst of claim 1, wherein said first and second exchanged metals are copper.

5. The catalyst of claim 1, wherein at least one of the first molecular sieve and the second molecular sieve is an extrudate.

6. The catalyst of claim 1, wherein the first extra-framework metal is present in an amount of about 1 to about 5 wt % based on the total weight of the molecular sieve, and the second extra-framework metal is present in amount sufficient to achieve a weight ratio of the first extra-framework metal and the second extra-framework metal of about 0.4:1.0 to about 1.5:1.0.

7. The catalyst of claim 1, wherein the first molecular sieve and the second molecular sieve are present in a mole ratio of about 0.5:1:0 to about 1.5:1.0.

8. The catalyst of claim 1, wherein the catalyst composition is washcoated on a wall-flow filter.

9. The catalyst of claim 8, wherein the washcoat is within the filter walls.

10. The catalyst of claim 8, wherein the washcoat is a layer on the filter walls.

11. The catalyst of claim 10, wherein the filter contains inlet and outlet channels and the washcoat is on outlet channels.

12. The catalyst of claim 1, wherein the catalyst composition is washcoated on a flow-through honeycomb monolith.

13. The catalyst of claim 12, wherein the flow-through honeycomb monolith further comprises an oxidative underlayer.

14. The catalyst of claim 13, wherein said underlayer comprises a platinum group metal.

15. The catalyst of claim 8, further comprising an ammonia oxidation catalyst disposed downstream of the wall-flow filter.

16. The catalyst of claim 12, further comprising an ammonia oxidation catalyst disposed downstream of the flow-through honeycomb monolith.

17. The catalyst of claim 8, further comprising a $NO_x$ adsorber catalyst (NAC), a lean $NO_x$ trap (LNT), or a $NO_X$ storage/reduction catalyst (NSRC) located upstream of the wall-flow filter.

18. The catalyst of claim 8, further comprising an oxidation zone comprising a platinum group metal.

19. The catalyst of claim 18, wherein the platinum group metal is Pd.

20. The catalyst of claim 19, wherein the platinum group metal is Pt.

* * * * *